Dec. 24, 1935.   A. J. WEATHERHEAD, JR   2,025,427
METHOD OF SECURING HOSES AND COUPLINGS
Filed July 29, 1932
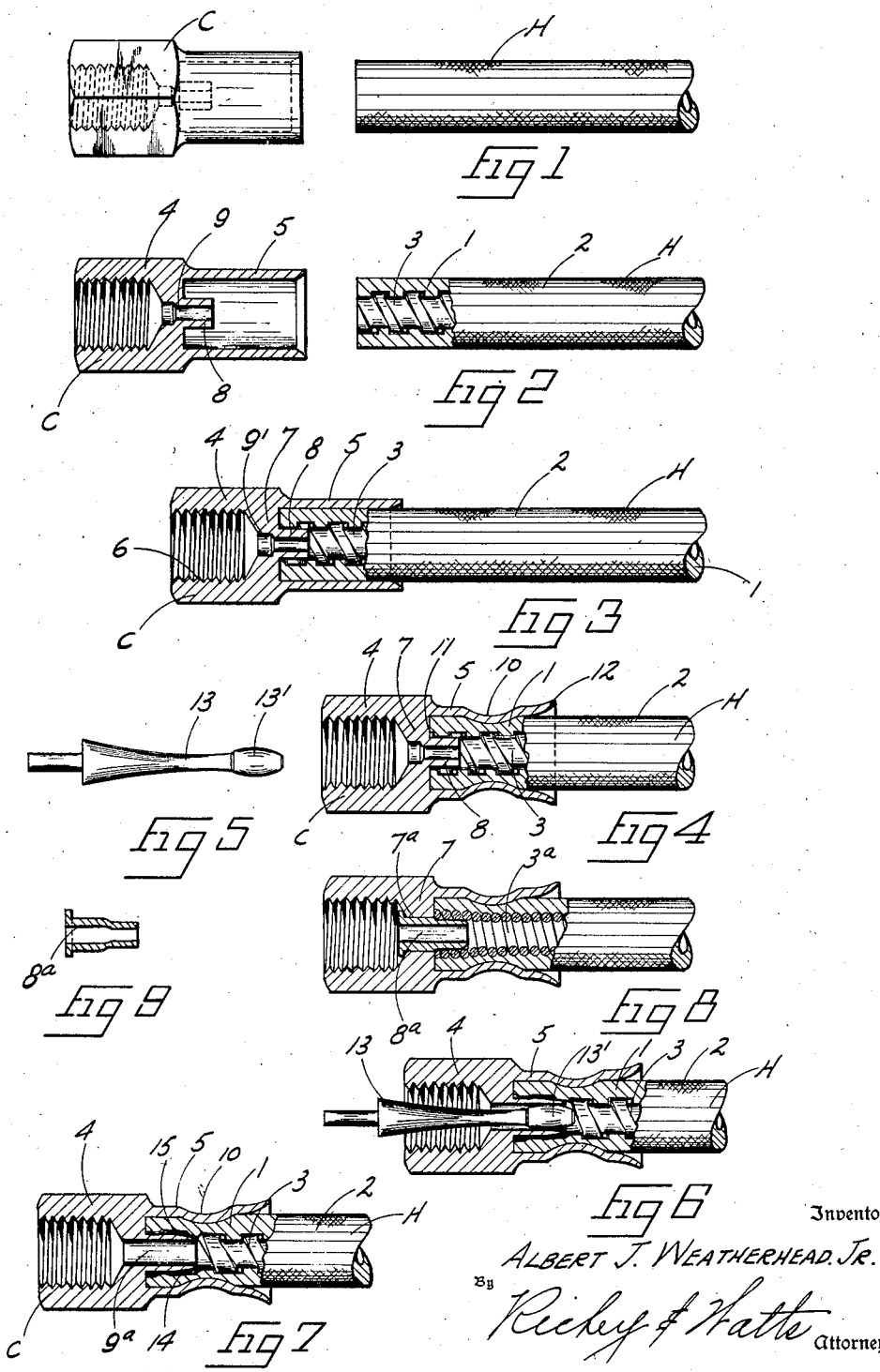
Inventor
ALBERT J. WEATHERHEAD, JR.
By Richey & Watts
Attorney Patented Dec. 24, 1935

2,025,427

UNITED STATES PATENT OFFICE 2,025,427

METHOD OF SECURING HOSES AND COUPLINGS

Albert J. Weatherhead, Jr., Cleveland, Ohio, assignor to The Weatherhead Company, Cleveland, Ohio, a corporation of Ohio Application July 29, 1932, Serial No. 625,984

8 Claims. (Cl. 29—148.2)

This invention relates to methods of attaching hose couplings to hose ends. More particularly, this invention, at least in its preferred form, relates to methods of affixing couplings to the ends of metal lined rubber hoses.

It is among the objects of my invention to provide an economical method for securing a coupling to a hose end which will produce a secure, permanent and leak-proof joint. Another object is to provide a method of attaching couplings to hose ends in such a manner as to prevent swelling or distortion of the hose, or other action tending to obstruct the flow of fluid therethrough. Another and more specific object is to provide a method of attaching a coupling to a hose having a metallic lining in such a manner as to provide a permanent and leak-proof fluid joint and a strong mechanical connection.

Other objects will appear from the following description of a preferred form of my invention, reference being had to the accompanying drawing. The essential characteristics are summarized in the claims.

In the drawing, Fig. 1 illustrates an elevation of the coupling member and hose end to be joined; Fig. 2 is a longitudinal section of the same parts in the same condition; Fig. 3 is a longitudinal section showing the parts in the initial position of assembly; Fig. 4 shows the parts after the outer shell of the coupling has been deformed to clamp the exterior of the hose; Fig. 5 depicts an illustrative spinning tool; Fig. 6 illustrates the expansion and extension of the coupling nipple into engagement with the interior of the hose; Fig. 7 is a longitudinal section of the parts in finished assembled relation; Fig. 8 is a longitudinal section of a modified form of my invention; and Fig. 9 is a section of the nipple employed in the modified form.

Referring to the drawing, I illustrate in the several figures the hose H on which there is to be attached and secured the coupling C.

The hose H in the preferred form of my invention is of the type having a rubber body 1, a fabric covering 2, and a spirally wound interiorly disposed flexible metallic sheath or lining 3 with or without a layer of fabric between the metallic sheath and the rubber body. It will be appreciated that my invention is applicable to other types of hoses but the advantage of its application to this type of hose will serve to illustrate the benefits which would follow in its application to other hoses or other fluid conductors.

The coupling member C is illustrated as having an external preferably hexagonal body 4 with a cylindrical longitudinally extending sleeve part 5 which receives and snugly encompasses the exterior of the hose end including the braided cover, if any, when the parts are assembled. Within the body 4 of the coupling member there is illustrated an internally threaded cavity 6 which terminates in a centrally located wall 7. The coupling is thus adapted to receive male threads of an external agency and it will be understood that the construction at this part of the coupling may be inverted or otherwise changed all within the spirit of my invention.

Referring now more especially to those parts of the coupling which act to form the mechanical and fluid joint between the hose and the coupling, it will be seen (see Fig. 2) that I have provided a small thick walled nipple 8 extending from and preferably integral with the partition 7 coaxially of the sleeve 5 into the cavity formed by the sleeve 5 a short distance from the base of that cavity which is formed by the surface of the partition wall 7. The nipple 8 has a central axial bore 9 of much smaller diameter than the interior diameter of the metallic hose lining 3, and preferably has an enlarged opening 9' adjacent the cavity 6. The external diameter of the nipple 8 is preferably substantially the same as the least interior diameter of the hose lining 3 so that the nipple will snugly enter the interior of the hose when the parts are assembled as shown in Fig. 3 without distorting or distending the metallic lining 3 of the hose.

Thus the initial step in assembling the parts is shown in the transition from Fig. 1 to Fig. 3 wherein the end of the hose H is slipped into the sleeve 5 of the coupling, preferably in close sliding contact therewith, with the end of the hose contacting with the bottom of the cavity along the face of the partition wall 7 and the nipple 8 extending into and preferably snugly fitting the inside of the metallic liner 3 of the hose.

Referring to Fig. 4, the next step in assembling the parts consists in deforming the sleeve 5 of the coupling, as illustrated in Fig. 4, which is preferably accomplished in the manner more fully described and claimed in my copending application Serial No. 581,893, filed December 18, 1931. It will suffice for this description to refer to that application and say that the deformation of the sleeve preferably consists in rolling or spinning an annular groove 10 in the sleeve, as shown in Fig. 4, in a transverse plane removed from the end of the nipple 8. This reducing operation compresses the non-metallic portion of the hose and forces it into a compact mass exerting a pressure upon the metallic lining and also upon the surface of the partition wall 7, as at 11 in Fig. 4.

The metallic lining of the hose resists the radial component of force exerted in forming the groove 10 and maintains a clear fluid passage throughout and after the reducing operation. As also illustrated and described and claimed in my copending application, the formation of the groove 10 carries with it the formation of the bell-mouth 12 at the end of the sleeve 5, which relieves the hose of sharp bending strains at this point when in use.

At the conclusion of this step, as illustrated in Fig. 4, the hose is securely attached to the coupling and cannot be removed therefrom without disruption of one or more of the several parts and for that reason I prefer to perform this operation prior to the following operation so that the several parts are held in position from this point onward.

Still referring to Fig. 4, it will be noted that while the nipple 8 is in contact with the interior of the metal lining of the hose, fluid may flow around the outer periphery of the nipple and within the spiral grooves in the lining back to the face of the partition wall 7, thence into contact with the non-metallic composition of the hose. In the absence of my provision to the contrary, I have found that at least certain fluids will cause the non-metallic part of the hose to swell and tend to close up the fluid passage, either by crowding around the end of the metallic sheath or by working back through the spiral passage between the outer surface of the nipple and the inner surface of the sheath.

According to my invention, I propose to effect a tight metal to metal joint between the nipple and the inner metallic sheath, which serves the multiple purpose of compressing the non-metallic part of the hose and more firmly sealing the mechanical joint between the hose and the coupling, particularly along the surface 11, forming a metal to metal mechanical lock joint between the nipple and inner side of the convolutions of the metallic sheath, forming and maintaining a full size clear and clean fluid passage through the nipple, supporting the end convolutions of the inner sheath and assisting in preventing the separation of the hose from the coupling.

Referring now to Figs. 5 and 6, I have illustrated a spinning tool 13, which I prefer to use in performing the next operation. The spinning tool 13, having a headed end 13', is inserted through the cavity 6 of the coupling into contact with the base of the nipple at the bore 9 thereof and may be guided by the enlarged portion 9' of the bore. The tool is then forced from left to right, as shown in Fig. 6, through the nipple 8, preferably while relative rotation is maintained between the tool and the nipple, so that the nipple is enlarged diametrically and spun out and expanded, preferably as shown in Fig. 6. As a result, the metal of the nipple and that adjacent its base in the partition wall 7 is forcibly distorted radially and outwardly to produce a tight joint with the inner metallic sheath 3, the spiral convolutions of which are preferably somewhat crushed. The metal of the nipple is also forced longitudinally to the right as viewed in Fig. 6 and the bore of the nipple is expanded to substantial equality with the internal bore of the lining 3 of the hose. During this operation, which I regard as the preferred manner of expanding the nipple, the final fluid seal and mechanical joint is established between the hose and the coupling.

Referring to Fig. 7, in which is illustrated the finished joint in the parts as assembled, it will be seen that the original bore of the nipple has been expanded as at 9a to substantially the internal diameter of the metallic sleeve 3. The nipple has been extended longitudinally slightly to the point 14. The outer wall of the nipple has been forced into a tight joint with the internal spiral surface of the sheath 3, as at 15, thereby effectively blocking any passage, spiral or otherwise, through which the non-metallic part of the hose might swell into the main fluid passage. The sheath, in turn, in the zone of the nipple exerts a radial force on the non-metallic portion of the hose to press it against the inner wall of the coupling sleeve, one component of force acting longitudinally to force the end of the hose against the partition wall 7. The expansion of the nipple prevents any non-metallic part of the coupling from crowding or swelling into the fluid passage, aids in forming a fluid tight seal between the coupling and the hose and effects a mechanical engagement between the parts with the resulting advantages hereinbefore enumerated, and other advantages which those skilled in the art will readily understand.

In Figs. 8 and 9, I have illustrated an embodiment of my invention modified in two respects, of which either of the modifications may be applicable as modifying the preferred form without the other. In place of having the nipple 8 made integral with the partition wall 7, I show the application of a separate nipple 8a which may be inserted through an aperture 7a in the partition wall 7 and expanded outwardly into contact with the inner metallic sheath of the hose by a means such as a punch or other expanding tool. In this modified form of the application of my invention, I contemplate that the inner metallic sheath may comprise simply a closely wound spiral strand of wire or the like 3a together with a fabric sheath wound thereover, which so far as its function in the body of the hose is concerned, is similar to the metallic sheath, as illustrated in the preferred form of my invention.

In the modified form of my invention, the function of the nipple 8a with relation to the sheath 3a is substantially the same as the relation of the nipple and sheath in the preferred form in that the expanded nipple coacts with the inner metallic sheath of the hose to prevent the non-metallic part of the hose from entering the main fluid passageway, either adjacent the face of the partition wall 7, through the spiral convolutions of the sheath adjacent the nipple or otherwise.

While the foregoing comprises a description of a preferred form of my method as applied to preferred forms of couplings, those skilled in the art will appreciate that modifications and changes may be made in my method and that my method may be applied to different types of couplings and hoses all without departing from the spirit and scope of my invention. Therefore I do not wish to be limited to the forms herein described or in any manner other than by the claims appended hereto when given the range of equivalents to which my patent may be entitled.

I claim:

1. The method of affixing a coupling having an integrally formed internal nipple and a hose having an inner metal lining, which comprises joining the hose end and the coupling with the metal lining encompassing the nipple and then expanding the nipple by means of a spinning tool throughout its length radially and outwardly and in a longitudinal direction.

2. A method of affixing a coupling having a nipple with a passage therethrough and a nipple encompassing sleeve, to the end of a hose having a metal lining, which comprises inserting the end of the hose into the sleeve with the metal lining encompassing the nipple and thereafter contracting the sleeve inwardly against the hose to retain the hose within the coupling and then expanding the nipple outwardly to deform the metal lining.

3. The method of joining a metallic coupling having a sleeve and a coaxially disposed nipple to the end of a non-metallic hose having a metal lined passage therein, which comprises inserting the hose into the sleeve with the lined passage encompassing the nipple, deforming the sleeve inwardly in the zone beyond the end of the nipple to compress the non-metallic material of the hose against the metallic lining and to retain the hose within the coupling and thereafter expanding the nipple.

4. The method of joining a coupling having a sleeve and a nipple coaxially disposed with respect to said sleeve and having a passage therein, to the end of a non-metallic hose having a metal lined passage, which comprises sleeving the coupling on the hose with the nipple lying inside of the metal lined passage, forcing a portion of the sleeve inwardly against the non-metallic portion of the hose to retain the hose within the coupling, and thereafter expanding the nipple against the metallic portion of the hose.

5. A method of attaching a coupling having a sleeve and an axially disposed nipple encompassed by the sleeve and having a passage therein to one end of a non-metallic hose having a metal lined passage, which comprises inserting the hose into the sleeve of the coupling and over the nipple, deforming the sleeve in the zone behind the end of the nipple into engagement with the non-metallic portion of the hose, and thereafter expanding the nipple radially and longitudinally while increasing the diameter of the passage therein to a diameter substantially equal to the diameter of the passage in the hose.

6. The method of joining a coupling having a sleeve and a coaxially disposed nipple within the sleeve to one end of a hose having a metal lined passage, comprising inserting the hose into the sleeve and over the nipple and thereafter compressing the hose in a zone beyond the end of the nipple and within the zone of the sleeve and in a zone between the nipple and the sleeve.

7. The method of joining a coupling having a sleeve and a nipple disposed within the sleeve to a non-metallic hose having a supporting lining, comprising placing the coupling on the hose with the lining of the hose encompassing the nipple and the sleeve of the coupling encompassing the non-metallic portion of the hose and thereafter distorting the sleeve to compress the material of the hose inwardly and radially against the non-metallic portion of the hose and thereafter distorting the nipple to expand the lining of the hose in the zone defined by the nipple radially and outwardly thereby compressing the non-metallic portion of the hose against the sleeve in the last named zone.

8. The method of joining a coupling having a sleeve, an interior wall adjacent the sleeve and a nipple disposed within the sleeve and projecting from the wall, to a non-metallic hose having a metallic lining, comprising placing the coupling on the hose with the metal lined portion of the hose encompassing the nipple and the sleeve of the coupling encompassing the non-metallic portion of the hose and thereafter securing the coupling to the hose, compressing the non-metallic body of the hose and longitudinally crowding the non-metallic body of the hose against the wall by deforming the sleeve inwardly, and expanding the nipple against the metallic portion of the hose to thereby deform the metallic portion.

ALBERT J. WEATHERHEAD, Jr.